United States Patent [19]

Stahly et al.

[11] Patent Number: 5,266,208

[45] Date of Patent: Nov. 30, 1993

[54] SYSTEM AND METHOD FOR CLEANING WATER

[75] Inventors: Shawn M. Stahly; See C. Chan; Clay A. Ellison, all of Billings, Mont.

[73] Assignee: Braun Intertec Environmental, Inc., Eden Prairie, Minn.

[21] Appl. No.: 890,714

[22] Filed: May 29, 1992

[51] Int. Cl.$^5$ ............................................. B01D 15/00
[52] U.S. Cl. .................................. 210/669; 210/694; 210/804; 210/807; 210/908; 210/195.1; 55/257.1
[58] Field of Search ............... 210/804, 661, 663, 670, 210/807, 776, 791, 263, 201, 195.1, 799, 923, 669, 622, 610, 749, 694, 908, 195.1, 669; 55/47, 257.1

[56] References Cited

U.S. PATENT DOCUMENTS

| | | | |
|---|---|---|---|
| 4,036,750 | 7/1977 | Jaros et al. | 210/669 |
| 4,053,396 | 10/1977 | Trense et al. | 210/661 |
| 4,186,085 | 6/1980 | Savage | 210/669 |
| 4,207,179 | 6/1980 | McCarthy et al. | 210/622 |
| 4,230,801 | 10/1980 | Gutnick et al. | 210/611 |
| 4,290,894 | 9/1981 | Török et al. | 210/661 |
| 4,608,160 | 8/1986 | Zoch | 210/114 |
| 4,816,158 | 3/1989 | Shimura et al. | 210/610 |

OTHER PUBLICATIONS

Environmental Systems technical brochure for Oil/Water Separator corresponding to a oil/water separator claimed in U.S. Pat. No. 4,608,160, revised version May 1991, pp. 1–10.

Megator Oily Water Separator technical brochure. Applicants believe that they obtained this brochure sometime in the Fall of 1991, p. 2.

Vinholmen Services AS technical brochure entitled "The New Solution to Oil Pollution". Applicants believe that they obtained this technical brochure sometime in the Fall of 1991, pp. 1–2.

Action Engineering Inc. technical brochure entitled "Action Engineering Inc. Makes the Hunter Oil Skimmer & The Hi-Rise LLS Liquid/Liquid Separator". Applicants believe that they obtained a copy of this brochure sometime in the Fall of 1991. pp. 1–3.

Product Brochure, "ORS TCLP Systems in Operation at Bulk Terminals", ORS Environmental Equipment, Greenville, N.H., Winter, 1991-1992.

Product Brochure, "Introducing Aquazorb TM Activated Carbon Adsorption System", Hadley Industries, Ludington, Mich., published on a date prior to May 29, 1992.

Product Brochure, "Environmental Instruments Activated Carbon", Environmental Instruments, published on a date prior to May 29, 1992.

Product Brochure, "Portable Airstripping Tower", Carbon Air Services, Inc., Hopkins, Minn., published on a date prior to May 29, 1992.

Product Brochure, "H2 Oil Recovery Equipment Air Stripping Tower", Bend, Oreg., published on a date prior to May 29, 1992.

Product Brochure, "Drums and Systems for Carbon Adsorption", Continental Environmental Services, Gainesville, Fla., published on a date prior to May 29, 1992.

Product Brochure, "CECASORB TM Adsorbent Canisters", Atochem North America, Inc., published on a date prior to May 29, 1992.

(List continued on next page.)

Primary Examiner—Robert A. Dawson
Assistant Examiner—Ana M. Fortuna
Attorney, Agent, or Firm—Merchant, Gould, Smith, Edell, Welter, & Schmidt

[57] ABSTRACT

A process and system are provided for treating wastewater having at least a hydrocarbon component and water in which a multi-phase liquid system including an aqueous hydrocarbon-contaminated layer is formed and isolated from a remaining hydrocarbon-enriched layer. The aqueous hydrocarbon-contaminated layer is treated to remove volatile hydrocarbon contaminant, insoluble organic contaminant and dissolved hydrocarbon contaminant.

20 Claims, 6 Drawing Sheets

OTHER PUBLICATIONS

Product Brochure, "Strippers (Aeration Towers)", Ceilcote, published on a date prior to May 29, 1992.
Product Brochure, "TM-100: Protection for Activated Carbon Water-Treatment Systems", Technical Minerals, Inc., published on a date prior to May 29, 1992.
Product Brochure, "Selection Criteria for Granular Activated Carbon (GAC)", TIGG Corporation, Pittsburgh, Pa., published on a date prior to May 29, 1992.
"Design of Aeration Towers to Strip Volatile Contaminants from Drinking Water", Kavanaugh et al., *Journal of A.W.W.A.*, pp. 43-51, published on a date prior to May 29, 1992.
"Liquid-Gas Systems", Perry, R. H., *Chemical Engineers' Handbook*, Section 18, pp. 18-22 through 18-25, published on a date prior to May 29, 1992.
"Air Stripping of Organic Compounds", J. Michal, *Pollution Equipment News*, pp. 103-110, Aug. 1988.
"Gas Transfer", Montgomery, J. M., *Waste Treatment Principles and Design*, John Wiley and Sons, Inc., pp. 237-261, 1985.
"Interim Private Water Well Remediation Using Carbon Adsorption", Hall et al., *GWMR*, pp. 77-83, Winter 1987.

SYSTEM AND METHOD FOR CLEANING WATER

BACKGROUND OF THE INVENTION

1. Field of the Invention

The present invention relates to processes and equipment for the continuous or batchwise treatment of wastewater containing hydrocarbon contaminants.

2. Description of the Prior Art

Petroleum bulk storage facilities for such products as gasoline and diesel fuel generate quantities of wastewater which are contaminated with hydrocarbon components or contaminants. Floating top petroleum storage tanks accumulate some quantity of water due to seepage around wall seals. Wastewater may also be generated from contaminated bulk shipments which are loaded into the tanks. Once inside a petroleum bulk storage tank, water settles to a sump area which is periodically pumped out to remove the water contamination. Furthermore, petroleum bulk storage facilities have rail or truck transfer stations at which small quantities of petroleum products are spilled during hook-up and disconnect of bulk transfer equipment. The petroleum products associated with these small spills are collected in spill-containment sumps where they mix with storm water. Contaminated wastewater may also include groundwater which has been contaminated by a migrating plume of hydrocarbon contaminants from a spill or tank leak. Prior to recently promulgated Environmental Protection Agency regulations, such hydrocarbon-contaminated wastewater was typically dumped on the ground or hauled as non-hazardous waste to disposal facilities.

The wastewater that is generated from the above sources often contains elevated levels of benzene along with varying concentrations of toluene, ethylbenzene and xylenes. Other petroleum hydrocarbons will also be present. On Mar. 29, 1990, the Environmental Protection Agency (EPA) promulgated the revised toxicity characteristics rule. Benzene, a water-soluble hydrocarbon compound which is present in gasoline, was included in the list of newly-included constituents. Under the new regulation, a benzene concentration of 0.5 mg/l would trigger classification of the wastewater as a hazardous waste and subject such stream to stringent EPA hazardous waste management standards. The wastewater generated must therefore be treated to remove chemicals which the EPA would classify as triggering a hazardous waste designation, in particular benzene, but also other hydrocarbon contaminants which face discharge restrictions by state environmental agencies.

In order to meet environmental regulations, generators of hydrocarbon-contaminated wastewater such as petroleum bulk storage facilities, both large and small, must install or have available to them, methods for treatment of such wastewater. This requires a system which is economically feasible for generators of varying size while minimizing operating labor requirements.

A need exists for a continuous or batchwise system which removes benzene and other hydrocarbon contaminants from wastewater generated at petroleum bulk storage facilities. Preferably the process or system is one which reduces the concentration of such contaminants to below EPA and state environmental agency acceptable maximum levels. Furthermore, there is a need for a system which combines the necessary equipment to remove hydrocarbon contaminants in a complete system which is economical and requires minimum operating labor. The present invention addresses these needs as well as other problems associated with cleaning wastewater generated at petroleum bulk storage facilities in an advantageous manner.

SUMMARY OF THE INVENTION

The present invention provides an overall process and discloses equipment for the treatment of hydrocarbon-contaminated wastewater wherein the concentration of benzene and other hydrocarbon contaminants is reduced. In preferred applications, the resulting effluent leaves the process of the invention as a non-hazardous wastewater stream which may be discharged to the environment. The overall system combines several unit operations, each directed to removal of a specific contaminant type. Specifically, in a preferred embodiment, the unit operations include phase separation, air stripping or aeration, activated clay filtration and activated carbon filtration. With such combination, gravity-separable or immiscible hydrocarbon materials or contaminants are returned to petroleum storage tanks while volatile hydrocarbon contaminants, insoluble organic contaminants and soluble hydrocarbon contaminants are removed or reduced in concentration in the wastewater.

Hydrocarbon-contaminated wastewater is collected from one of various sources. This may include the sump water from petroleum bulk storage tanks or spilled petroleum products at bulk transfer stations combined with storm water. Although these are the expected sources of such hydrocarbon-contaminated wastewater streams, it is recognized that any wastewater containing at least one hydrocarbon contaminant may be treated in the system disclosed herein. Expected compositions of hydrocarbon contaminated wastewater will include: water, insoluble organic contaminant, volatile hydrocarbon contaminant and dissolved hydrocarbon contaminant. It is believed that the prior art does not teach or disclose a system combining the above-cited unit operations into an overall process, especially one capable of meeting regulatory requirements, while providing an apparatus which is economically feasible for such wastewater generators.

The wastewater, containing hydrocarbon contaminants, is first fed to equipment constructed and arranged to retain hydrocarbon-contaminated wastewater while a portion of any immiscible hydrocarbon present separates from the hydrocarbon-contaminated wastewater to form two or multiple phases. In a preferred embodiment, a separator tank in which gravity (phase) separation of a major portion of the immiscible hydrocarbon contaminant from the hydrocarbon-contaminated wastewater takes place is used. The separator also serves as a storage reservoir for wastewater feed to the downstream unit operations of the system. Any separated organic liquid floating on the water phase in the separator tank can be decanted to an aboveground decant tank or suitable petroleum bulk storage vessel. Equipment constructed in a way to allow transfer of liquid from the hydrocarbon phase only is used to decant the liquid. In a preferred embodiment, this is accomplished by manually adjusting a vertical sliding flex tube (or similar apparatus) to position the opening of the tube beneath the surface of the organic liquid or hydrocarbon phase, but above the surface of the aqueous phase. The organic liquid enters through the opening in the top of the tube and is conveyed through the tube out the side of the separator tank, for example by gravity drainage.

The remaining contaminated wastewater, or aqueous hydrocarbon-contaminated layer, in the separator tank is transferred batchwise or continuously to a surge tank. An antifoaming agent may be added to this stream either prior to or in the surge tank, utilizing equipment constructed in a way to allow addition of such antifoam agent. The surge tank is preferably equipped with high and low shut-off flow controls which act as flow rate buffers to accommodate variation of fluid flow rates into and out of the tank. A submersible pump within the surge tank is utilized to feed, at a controlled flow rate, contaminated water to a countercurrent air stripper.

The contaminated wastewater enters the top of the countercurrent air stripper through a nozzle or multiple nozzles which distribute the wastewater over the packing within the air stripper. Air is forced upward from the bottom of the stripper along the length of its packing by a blower located at the bottom of the stripper. Wastewater entering the top of the stripper flows downward in continuous and thorough contact with the airstream. Transfer of volatile hydrocarbon contaminant from the wastewater into the air phase occurs during contact. As the wastewater cascades down through the packing, the concentration of volatile constituents dissolved in the wastewater is successively reduced due to partitioning into the air phase. In particular, volatile components, such as benzene, toluene, ethylbenzene and xylenes are reduced to low concentrations in the countercurrent air stripper.

Although for the embodiment, as thus far described, a countercurrent air stripper has been utilized to remove volatile organic contaminant, it is recognized that other unit operations which provide high contact surface area between a water stream and an air stream with resultant partitioning of the volatile components may be utilized. This would include aerating a storage vessel containing the contaminated wastewater. It is, however, believed that a countercurrent air stripper provides a particularly economical and efficient method of removing the volatile contaminant within the wastewater stream and reduces the overall cost of wastewater treatment by prolonging the useful life of downstream carbon filtration mediums.

The effluent leaving the bottom of the countercurrent air stripper, or other high contact surface area equipment constructed in a way to reduce the concentration of volatile hydrocarbon contaminant, is a volatile hydrocarbon-depleted wastewater stream which is fed to an activated clay filter. The activated clay filter is designed to reduce the concentration of insoluble organic contaminant and color in the wastewater. In a preferred embodiment the activated clay filter contains a mixture of activated clay and anthracite (coal) filter media. The activated clay operates through a partitioning phenomena that has little relationship to surface area. The effectiveness of the filter to absorb (or adsorb) organic compounds is directly related to the solubility of the organic constituent in water. Organics that are highly water soluble or that are quite volatile will absorb (or adsorb) poorly onto the filter. Thus, the filters will remove from water free emulsified and dissolved organics which are sparingly water soluble with the main constituents being absorbed (or absorbed) being oil and grease. The use of such clay filters prevents downstream fouling of the activated carbon filters while removing undesirable contaminants from the final discharge stream.

Downstream from the activated clay filter, the concentration of dissolved hydrocarbon contaminant is reduced. The wastewater is routed through one or a series of granular-activated carbon filters designed in a way to reduce the amount of dissolved hydrocarbon contaminant in wastewater contaminated therewith. In a preferred embodiment, two filters are provided in series so that breakthrough may be detected at an intermediate point. This allows changing of the first filter medium prior to breakthrough of the second filter and subsequent discharge of contaminated water. The activated carbon filters are designed and used to remove dissolved hydrocarbon contaminant, color and some inorganic constituents in the wastewater. These dissolved compounds may include phenols, naphthalene and volatile hydrocarbons still present in the wastewater due to lack of 100% efficiency in the air stripper. The conduct of a previous step of removal of volatile organics, for example by air stripping, facilitates the conduct of the filtering with the activated carbon filters. In particular, the volatiles are no longer present in such a high concentration that they would tend to prematurely overload or "spend" the activated carbon. Thus, the activated carbon can be more efficiently used to remove dissolved non-volatiles. The effluent discharge from the activated carbon filters may in many instances be discharged directly to the environment without further treatment. Alternatively, the effluent may be treated at a standard municipal wastewater treatment facility.

It is noted that the combination of unit operations as described provides an economical system which may be utilized by generators of hydrocarbon-contaminated wastewater regardless of the size of their operation. Furthermore, the system is non-labor intensive. The overall system may also incorporate design features which allow the unit to be mobile, thus readily transferred to remote sites for use in wastewater clean-up.

These and various other advantages and features of novelty which characterize the present invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there are illustrated and described preferred and alternative embodiments of the present invention.

BRIEF DESCRIPTION OF THE DRAWINGS

In the drawings, in which like reference numerals indicate corresponding parts or elements of preferred or alternative embodiments of the present invention throughout the several views.

DETAILED DESCRIPTION OF PREFERRED AND ALTERNATIVE EMBODIMENTS

As required, detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one skilled in the art to variously practice the present invention.

Figure 1:
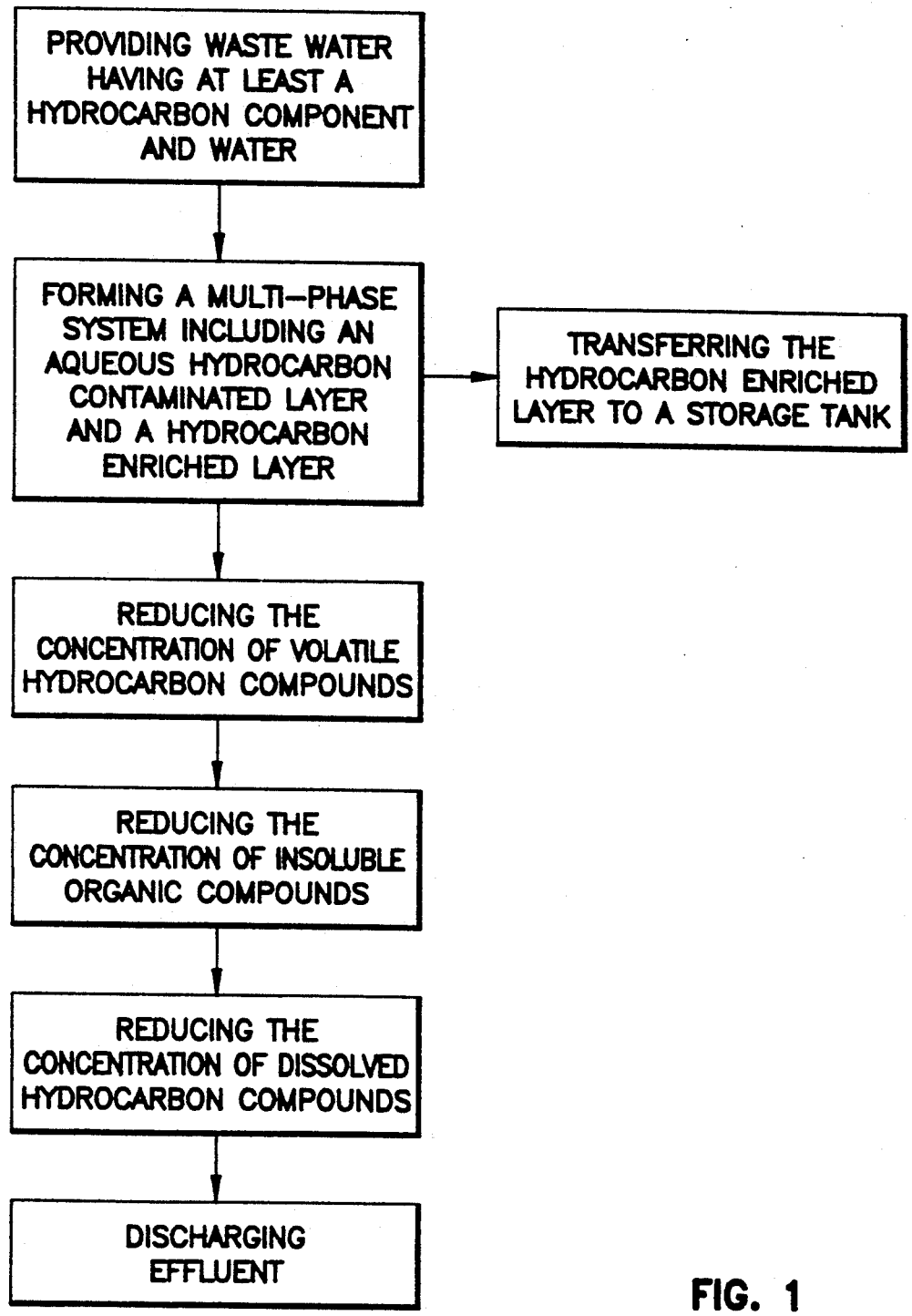
FIG. 1 is a flow chart of the general overall process steps of the present invention.

Referring now to the figures, FIG. 1 represents a generalized flow chart of the overall system disclosed herein. As indicated, wastewater contaminated with at least one hydrocarbon component, is transferred to a separator. It is expected that such wastewater will contain at least insoluble organic contaminant, volatile hydrocarbon contaminant, dissolved hydrocarbon contaminant and water. Within the separator multiple phases are formed, with the hydrocarbon layer (typically the upper layer) including gravity-separable or immiscible hydrocarbon compounds while the aqueous (lower) layer constitutes an aqueous hydrocarbon contaminated layer. Gravity-separable or immiscible hydrocarbon compounds are those compounds which form a separate, distinct phase separation when a mixture of such hydrocarbon with water is allowed to stand with gravity as the force of separation, however, it is recognized that the separation is not perfect and that a quantity of such immiscible hydrocarbon will be present as a contaminant in the aqueous hydrocarbon-contaminated layer. The gravity-separable hydrocarbon-enriched layer is transferred to a storage tank. The aqueous hydrocarbon-contaminated layer formed as the lower phase in the separator is isolated within the tank and processed through the remaining unit operations disclosed herein. These unit operations include processes for reducing the concentration of volatile hydrocarbon contaminants, reducing the concentration of insoluble organic contaminants, reducing the concentration of dissolved hydrocarbon contaminants and discharging the treated effluent.

Figure 2:
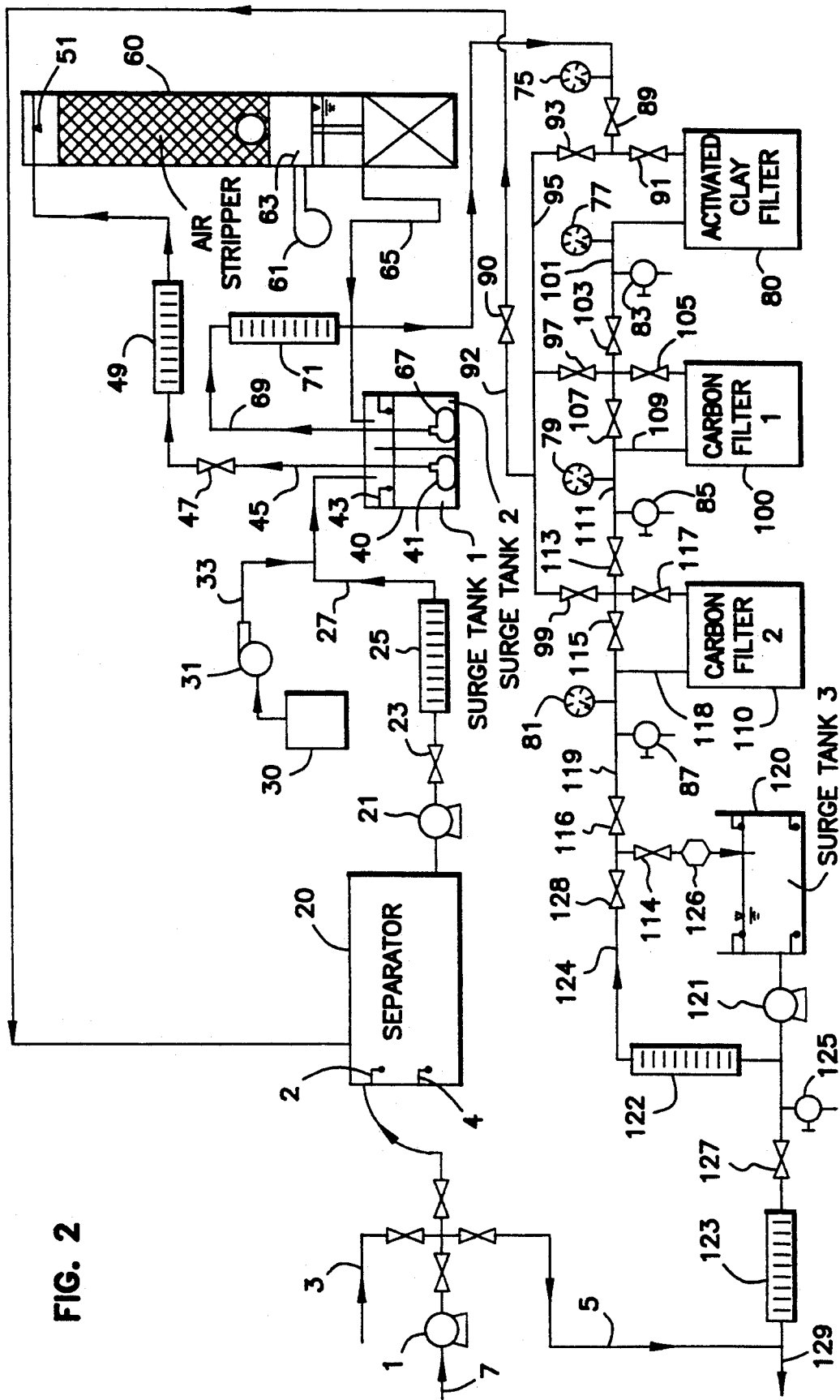
FIG. 2 is a detailed schematic representation of a preferred overall hydrocarbon-contaminated wastewater treatment system in accordance with the present invention.

FIG. 2 represents a detailed schematic diagram of a preferred embodiment of the overall process disclosed herein. Wastewater containing at least one hydrocarbon component is transferred into the process of the present invention through one of two contaminated wastewater feed lines 3 or 7. In a preferred embodiment it is understood that the two feed lines, 3 and 7, are available as options depending upon whether it is necessary to utilize a pump 1 to achieve adequate head pressure to transfer the hydrocarbon-contaminated wastewater into the separator 20.

The wastewater, containing at least one hydrocarbon component or contaminant, may come from many sources and contain various hydrocarbon contaminants at widely differing levels of contamination. Thus, the system to remove such contaminants must have adequate capacity and flexibility to remove such a mixture of contaminants. Some such sources include but are not limited to, sump water from petroleum product bulk storage tanks, spilled hydrocarbon or petroleum products at bulk transfer stations, such as rail stations and trailer stations which collect in spill ponds or sumps and mix with storm water, hydrocarbon-contaminated ground water from spill migration or contaminated wash water from bulk transfer equipment cleaning operations.

Hydrocarbon contaminants present in the wastewater may include any hydrocarbon compound which may be classified as immiscible, volatile, soluble or insoluble and include all components found in those products stored at petroleum bulk storage facilities, especially gasoline and diesel fuel. It is recognized that some hydrocarbon compounds will fit more than one classification. For example, immiscible hydrocarbons are generally insoluble, however not all insoluble hydrocarbon compounds are gravity-separable. Within this disclosure, the hydrocarbon compound is categorized on the basis of type of unit operation which removes such compound from wastewater contaminated therewith. It is recognized that no unit operation is 100% efficient. In the system of the present invention, the overall efficiency is greatly improved by combining unit operations that function to remove trace amounts not removed from a prior unit operation. For example, volatile hydrocarbons are readily removed by air stripping in an economical process which is not 100% efficient. Residual volatile hydrocarbon contaminant remaining are readily removed to low concentration in an activated carbon filter which is a more costly yet highly efficient cleanup device. The economical air stripper removes the majority of volatile hydrocarbons while the more costly carbon filters complete treatment. It is recognized further, that some soluble hydrocarbons are not removed in air stripping, because they are not sufficiently volatile. These are, however, removed in carbon filtration.

The specific hydrocarbon compounds or contaminants which may be present include, but are not limited to, benzene, toluene, ethylbenzene and xylenes which are collectively referred to as BTEX. BTEX are those hydrocarbon compounds identified by analysis under EPA method 602, incorporated herein by reference. Other hydrocarbons which may be present are collectively referred to as TPH or total petroleum hydrocarbons which are those hydrocarbons quantified in an analysis under EPA method 418.1 which is incorporated herein by reference. TPH includes such compounds as straight chain alkanes, alkenes or other saturated and unsaturated hydrocarbons along with ringed hydrocarbons such as phenols or naphthalene. Ammonia compounds may also be present. The relative concentration of such hydrocarbon compounds or contaminants may vary dramatically depending upon the source of such contaminated wastewater and the degree of dilution with water. As will be seen from the disclosure below, the overall system is designed to handle such varied feed composition. It is expected, however, as detailed in Example 1 below, that BTEX and TPH levels found in such contaminated water sources as gasoline storage tank sump draws to be in the range of 50-100 parts-per-million (ppm) and 25-400 parts-per-million (ppm), respectively.

The overall process disclosed herein is designed and constructed in a way to remove at least about 90%, preferably at least about 95% and more preferably at least about 99% of the BTEX in the aqueous hydrocarbon-contaminated layer. Likewise, the overall process disclosed herein is designed and constructed in a way to remove at least about 80%, preferably at least about 90%, and more preferably at least about 95% of the TPH concentration in the aqueous hydrocarbon-contaminated layer.

Figure 3:
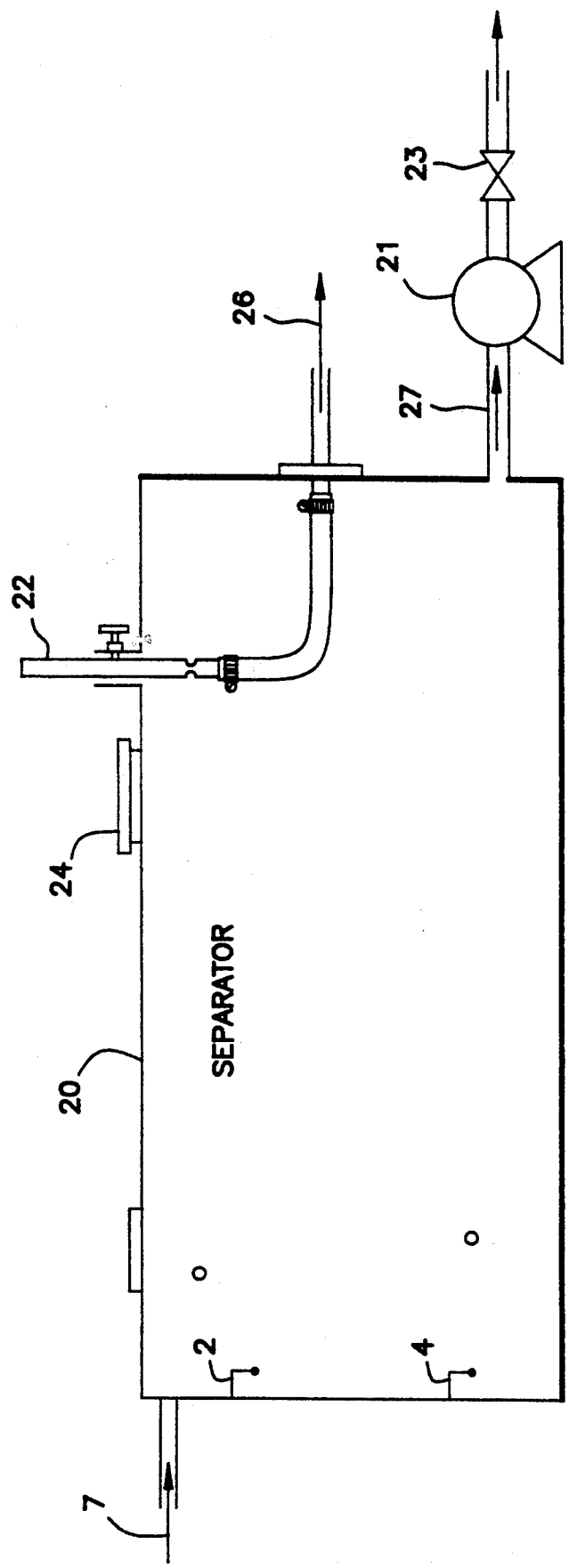
FIG. 3 is a detailed schematic of the oil/water separator utilized in a preferred embodiment of the present invention.

The hydrocarbon-contaminated wastewater is fed to a separator 20. Although shown in FIG. 2, refer also to FIG. 3 which represents a more detailed schematic drawing of the separator 20 utilized in a preferred embodiment of the present invention. Gravity separation to form a hydrocarbon layer or hydrocarbon-enriched layer and a contaminated water layer or aqueous hydrocarbon-contaminated layer takes place in the separator 20. In this separator 20, multiple phases are created, typically with any separated organic liquid or hydrocarbon floating on the water or aqueous hydrocarbon-contaminated layer. The organic liquid floating on the water may be decanted to a storage tank. As detailed in FIG. 3, in a preferred embodiment, the separator 20 is equipped with a manually-adjustable vertical sliding flex tube 22. The organic liquid is decanted by moving the manually-adjustable vertical sliding flex tube 22 to a position in which the opening of the tube is beneath the surface of the organic liquid, which has separated from the contaminated wastewater layer, but above the aqueous hydrocarbon-contaminated layer. The organic liquid or hydrocarbon enters through the opening in the tube 22 and is conveyed through the tube out the side outlet 26 of the separator 20, for example by the force of gravity. In preferred embodiments, the separator 20 also includes a high level switch 2 and a low level switch 4 to shut the system down when empty or prevent overfilling the separator 20 when full. The hydrocarbon/water interphase may be viewed through a port 24. In a preferred embodiment, the separator 20 is a 750 gallon to 1,250 gallon, preferably a 1,000 gallon cold-rolled black steel tank 4 feet in diameter and 10 feet long. It is understood, however, that a variety of vessels could be utilized, with the available surface area affecting the rate at which multiple phases are formed within the separator.

In a preferred embodiment, the hydrocarbon-contaminated wastewater or aqueous hydrocarbon-contaminated layer which remains as the bottom phase or layer within the separator 20 is transferred either continuously or batchwise to a first surge tank 40. This transfer is accomplished, in a preferred embodiment, by utilizing a pump 21 and a flow control valve 23 with the fluid flowing through a flow measuring device 25. In a preferred embodiment an antifoaming agent is metered from a storage vessel 30 by utilizing a metering pump 31. A transfer line 33 connects the antifoam system to the wastewater system to allow the antifoam to mix with the contaminated wastewater prior to entering the first surge tank 40. In a preferred embodiment, an antifoam agent such as BETZ Foam-Trol ®144, available from BETZ Laboratories, Inc., Trevose, Pa. 19053, or the like is used.

Figure 5:
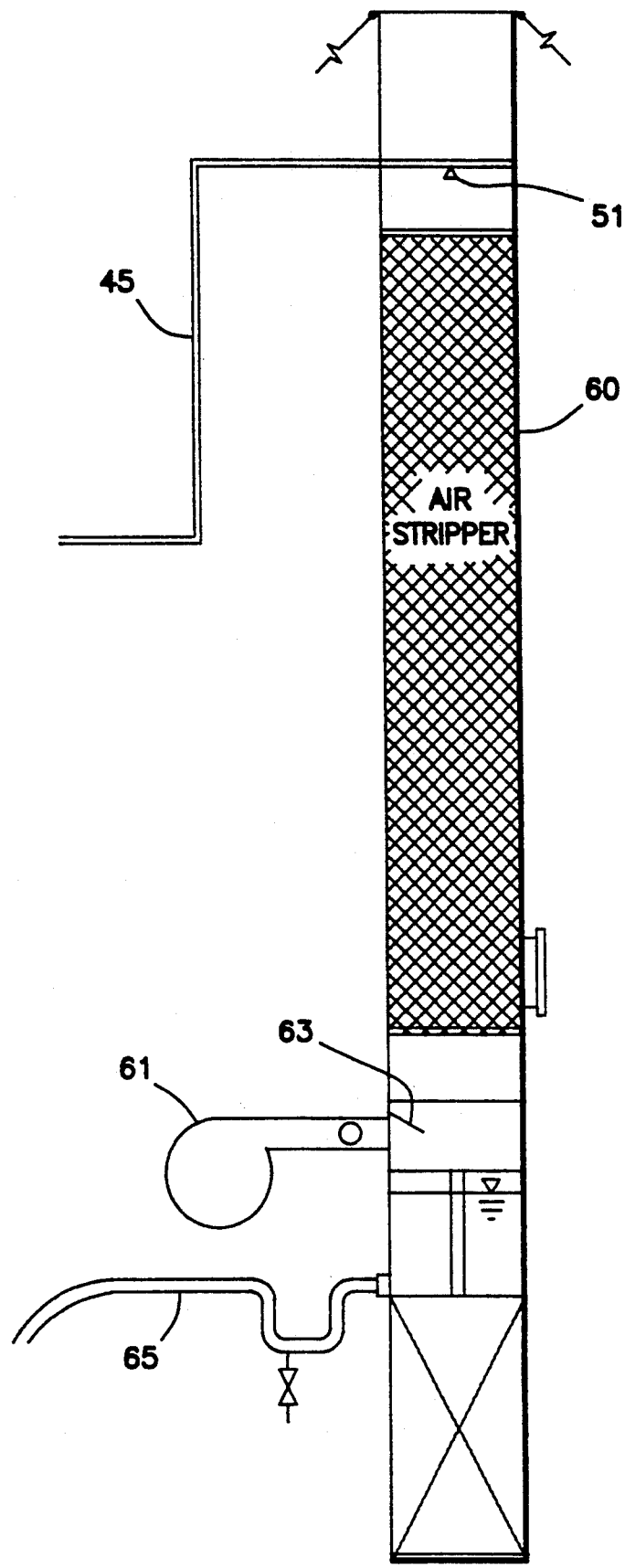
FIG. 5 is a detailed schematic of a countercurrent air stripper utilized in a preferred embodiment of the overall system in accordance with the present invention.

The first surge tank 40 is equipped with a submersible pump 41 and a high level switch 43. The high level switch 43, when activated, shuts down transfer into the first surge tank 40 to prevent overfilling. The submersible pump 41 is utilized to transfer the contaminated wastewater through a transfer line 45, a flow control valve 47 and a flow indicator 49 to a countercurrent air stripper 60. FIG. 5 provides a more detailed schematic of the air stripper 60. Although a countercurrent air stripper 60 is utilized in a preferred embodiment, any other known unit operation which increases the contact surface area of the liquid and allows contact between air and the contaminated wastewater could be utilized. The mass transfer of relatively more volatile hydrocarbons from the aqueous hydrocarbon-contaminated wastewater to air is driven by relative equilibrium concentrations. High surface area of contact between the water and air dramatically increases the overall rate of mass transfer. The countercurrent air stripper 60 of the present invention, preferably, includes a design based on the design criteria outlined in Example 2 below, with a preferred embodiment including an air stripper 60 capable of handling 12 to 15 gallons per minute of contaminated wastewater. The air stripper 60 includes, in a preferred embodiment, a 2-foot by 22-foot cold-rolled steel column with $\frac{1}{2}$ inch opening steel mesh packing support and hold-down plates and a 3 horsepower, 750–1,100 C.F.M., 8 to 14-inch static pressure explosion-proof blower.

In a preferred embodiment, the wastewater is sprayed through a nozzle 51 into the top of the countercurrent air stripper 60 which is filled with a packing material to increase the contact surface area. It is recognized that a variety of means for distributing a liquid over the diameter of the inside of the air stripper 60 would be sufficient. However, a preferred nozzle is a Fogjet ® full cone standard nozzle, manufactured by Spraying Systems Co. of Wheaton, Ill. 60188. As detailed in Example 2 below, the preferred packing is one-inch plastic Flex-irings ®, manufactured by Koch Engineering, Inc. of Wichita, Kans. 67220, however, any surface area increasing packing may be utilized with resulting impact on the efficiency of the air stripper 60. As the contaminated wastewater flows by gravity down the packing, it is contacted with air being forced in an upward direction through the air stripper 60. The source for the air flow is a blower 61. A backflow prevention device may be installed to prevent water from backing into the blower 61.

The air stripper 60 is utilized to remove volatile hydrocarbon contaminants. By volatile hydrocarbon contaminants it is meant those contaminants which have a suitable vapor pressure or relative volatility so that the concentration of such compound may be reduced by air stripping at ambient conditions. It is expected that these compounds will include, but not be limited to BTEX, which as previously stated, includes benzene, toluene, ethylbenzene and xylenes. As detailed in Example 1, the air stripper 60 is expected to (and indeed is constructed and arranged to) remove greater than about 90% of the BTEX, preferably greater than about 95% of the BTEX, more preferably more than about 99% of the BTEX in the aqueous hydrocarbon-contaminated layer or air stripper 60 feed. Likewise, the concentration of TPH in the aqueous hydrocarbon phase or air stripper 60 feed is expected to be (and indeed will be, if the arrangement is constructed and arranged according to preferred disclosures herein) reduced by about at least 70%, preferably about at least 80% and more preferably by at least about 90%. The efficiency of such removal depends on selected flow rates of water to the system along with air flow rate and concentration of the contaminants within the feed. In a preferred embodiment, criteria in selecting such rate is removal of benzene to less than about 10% by weight of its concentration in the feed (influent) to the air stripper 60, more preferably less than 5% by weight of the concentration in the feed (influent) to the air stripper 60.

The volatile hydrocarbon-depleted wastewater leaves the bottom of the air stripper 60 through a transfer line 65 which is equipped with a liquid trap to prevent blow-through of air from the blower 61. Through this transfer line 65, the wastewater is transferred to a second surge tank 40. As can be seen in FIG. 2, the first surge tank 40 and second surge tank 40 are, in a preferred embodiment, a single vessel partitioned to separate the two wastewater streams. In a preferred embodiment, this surge tank 40 is a 4-ft. by 4-ft. by 4-ft. partitioned steel tank, however, other vessels, or multiple vessels, with adequate surge capacity to buffer system surges due to nonequilibrium operation may be utilized. The second surge tank 40 is equipped with a submersible pump 67 which is utilized to transfer the volatile hydrocarbon-depleted wastewater through a transfer line 69 and a flow-measuring device 71 to an activated clay filter 80.

Figure 6:
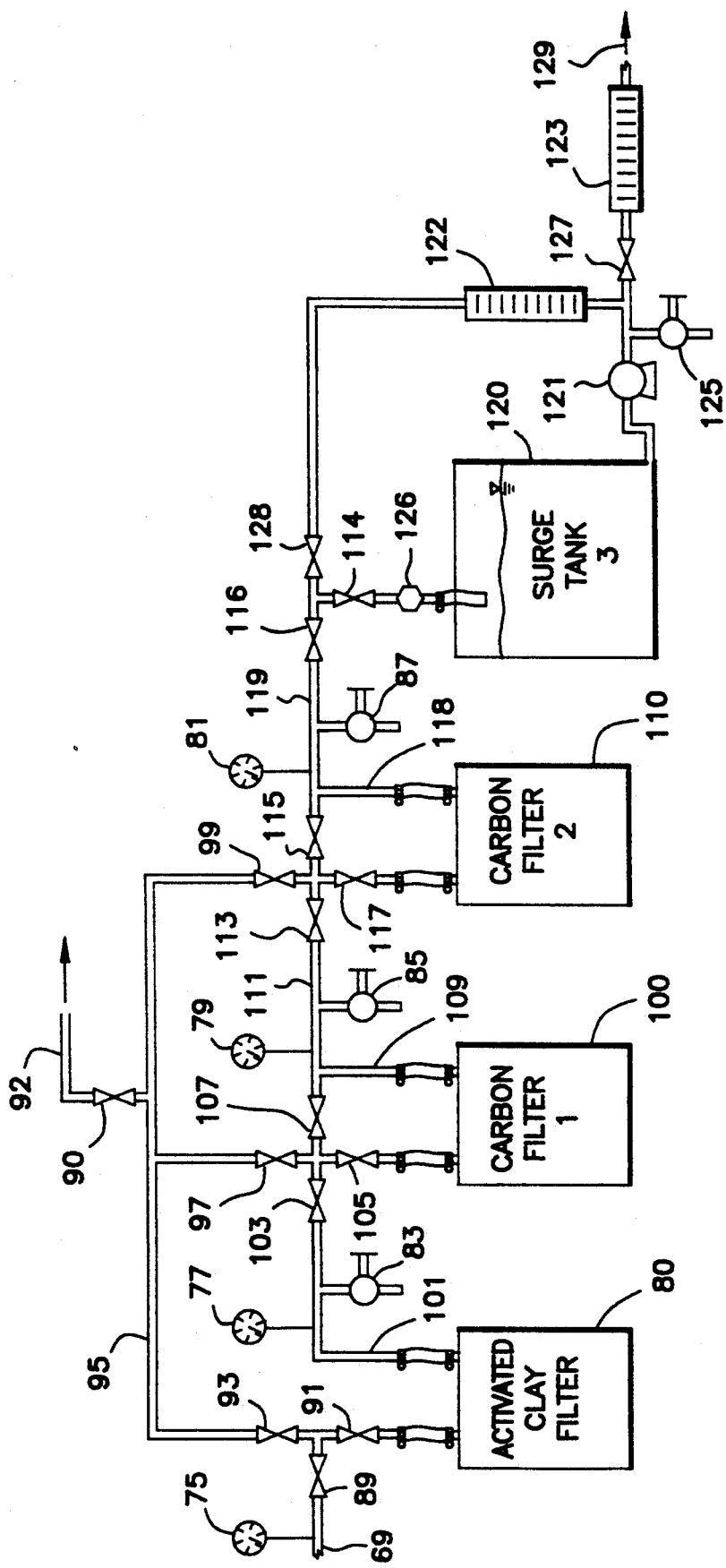
FIG. 6 is a detailed schematic of the activated clay filter and the two activated carbon filters utilized in a preferred embodiment of the present invention.

The activated clay filter 80 is utilized to remove insoluble organic compounds and color from the wastewater stream. As described in the example below, a preferred clay filter medium is Technical Minerals TM-100 which is a 30% active absorber or clay material and 70% anthracite filter media, which is a form of coal. It is, however, recognized that any filter media capable of separating oil and grease through a partitioning phenomena would be a substitute for TM-100. The activated clay filter 80 removes lightly emulsified oils and grease from solution and protects the downstream activated carbon filters, 100 and 110, from contamination. As shown in FIG. 2 and in more detail in FIG. 6, the activated clay filter 80 and its associated piping are equipped with valves, pressure gauges and sample taps to monitor the operation and effectiveness of the activated clay filter 80 while controlling the flow rate to such filter system. In a preferred embodiment, the activated clay filter 80 includes a canister or tank 27 inches in diameter and 40 inches high, filled with 535 pounds of adsorbent. This size may be varied with resulting effect on filter capacity and life. Design criteria for the activated clay filter 80 are detailed and explained in Example 4 below. Once insoluble organic contaminant are removed from the wastewater stream, the remaining wastewater contains dissolved hydrocarbon contaminants.

The dissolved hydrocarbon-contaminated wastewater leaves the activated clay filter 80 in a transfer line 101 and is fed to a carbon filter (GAC) 100. The carbon filter medium may be any commercially-available activated carbon filter medium, with selection affecting the efficiency and size of the filter equipment. In a preferred embodiment the carbon filter system includes two carbon filters in series, 100 and 110. Dissolved hydrocarbon compounds which will be present at this point in the system include those compounds which were not readily stripped in the air stripper 60, such as phenols and naphthalene. It should be understood that other hydrocarbon contaminants will be present in streams fed to the activated carbon filters 100 and 110. Also present are small concentrations of volatile hydrocarbon compounds such as BTEX compounds, which although are air-strippable, were not removed because the air stripper 60 is not 100% efficient.

Again referring to FIG. 2 and FIG. 6, in a preferred embodiment, the carbon filters, 100 and 110, are equipped with valves, sample taps and pressure gauges so that operating personnel may monitor the operation of such filters, including sampling to determine the efficiency of treatment and adjust flow rates through the system.

Subsequent to carbon filtration, the treated effluent is transferred to a third surge tank 120 through a transfer line 119. A pump 121 is used to transfer the treated effluent to a discharge point, which may include discharge to the environment or to a municipal water treatment facility. This transfer is controlled by a flow control valve 127 and monitored with a flow-measuring device 123, present in the transfer line 129.

The overall system also includes design, piping and valving which is configured to allow efficient backwashing of the activated carbon filters, 100 and 110, without discharging any fluid to the environment. It is recognized that the activated carbon filter media may become physically plugged by suspended bio-solids in the wastewater. Backwashing of the carbon filters, 100 and 110, will generally correct this problem and allow subsequent filtration without changing the filter media until such time that the media is saturated with soluble organic compounds. A pump 121 is utilized to transfer treated water through a flow-indicating device 122 in a transfer line 124 back through the manifold piping provided for each such carbon filter, 100 and 110.

Figure 4:
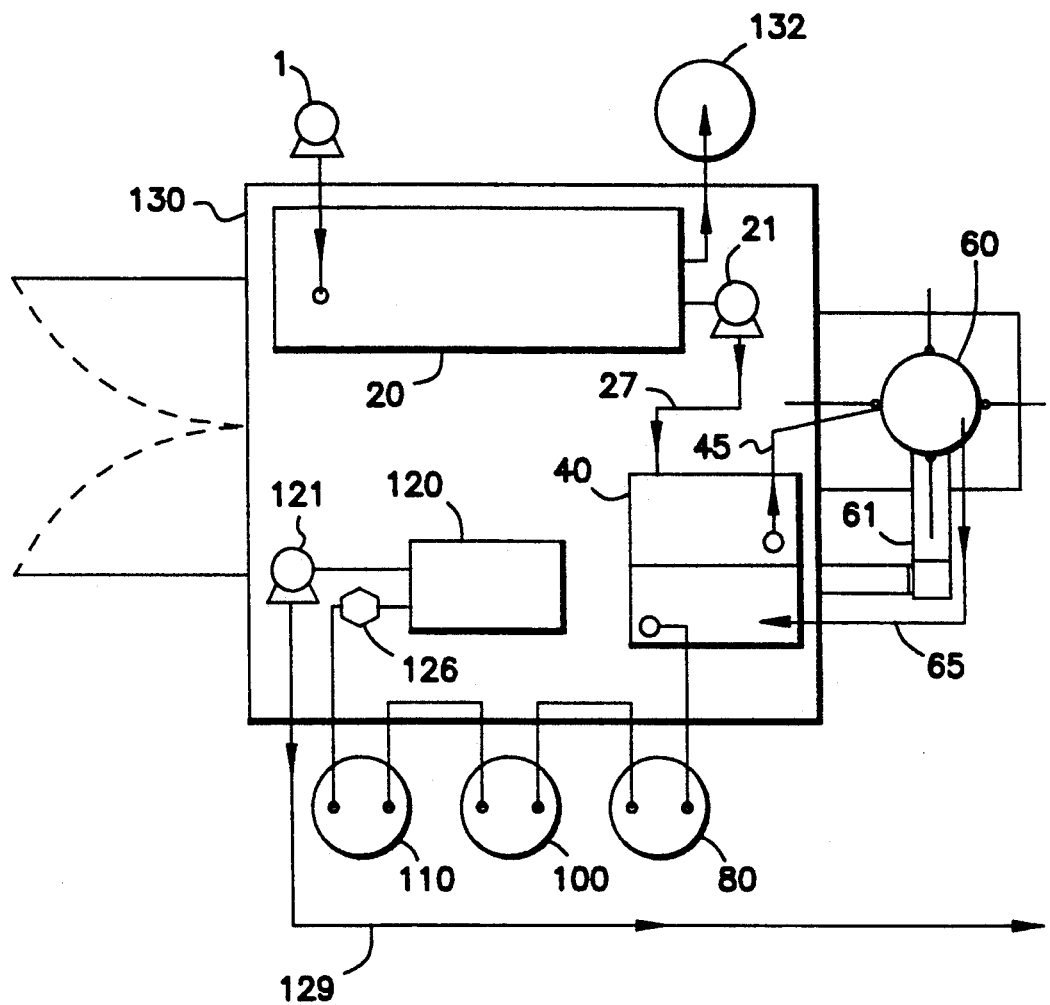
FIG. 4 is a detailed schematic of an overhead view of the equipment layout in a preferred embodiment of the present invention.

Now referring to FIG. 4, which schematically shows a preferred equipment layout, it is apparent that the design of the present system allows for a compact overall process. Indeed, such system may readily be adapted to be made mobile. The overall system would be mounted on a skid including the separator 20, a 250-gallon surge tank 40, the air stripper 60, the activated clay filter 80, the activated carbon filters, 100 and 110, and a 250-gallon effluent tank 120. The skid-mounted system can be mounted on a trailer. The air stripper 60 design would necessarily be modified to provide for a compact unit or one that folded at a pivot point. Quick couplings would be installed at the inlet to the separator 60 and the outlet of the activated carbon filters, 100 and 110, to accommodate easy connections to other components ancillary to the system. Likewise, electrical power connections would be provided.

EXAMPLE 1

Waste Stream Composition and Process Unit Performance Data

The following table shows actual analytical data for concentrations of benzene, toluene, ethylbenzene and xylenes (BTEX) and total petroleum hydrocarbons (TPH) at various points in the treatment process. Influent is feed to the indicated equipment while effluent is the stream leaving the indicated equipment. BTEX concentrations were determined by EPA method 602, and TPH concentrations were determined by EPA method 418.1. Samples were collected at various sampling points within the treatment system on Aug. 9, 1991 during the treatment system performance evaluation. The activated carbon filters are indicated as GAC.

| 12 GPM @ 550 CFM | Benzene | Toluene | Ethylbenzene | Xylenes (Total) | TPH |
|---|---|---|---|---|---|
| Air Stripper Influent Conc. (ppb) | 402 | 584 | 98 | 520 | 13400 |
| Air Striper Effluent Conc. (ppb) | 6.0 | 7.0 | <0.5 | 9.5 | 3000 |
| Air Stripper | 98.5 | 98.8 | 97.5 | 98.2 | 77.6 |

| 12 GPM @ 550 CFM | Ben-zene | Toluene | Ethyl-benzene | Xylenes (Total) | TPH |
|---|---|---|---|---|---|
| Removal (%) | | | | | |
| GAC Influent Conc. (ppb) | 6.0 | 7.0 | <0.5 | 9.5 | 3000 |
| GAC Effluent Conc. (ppb) | <0.5 | <0.5 | <0.5 | <1.0 | 1100 |
| GAC Removal (%) | 95.8 | 96.4 | N/A | 94.7 | 63.3 |

It is believed that the air stripper influent BTEX and TPH concentrations shown here are lower than what would normally be expected in the wastewater stream. This is because, in this case, the wastewater had resided in the separator tank for a period of time prior to sampling. It is expected that substantial amounts of volatile organic compounds were volatilized during that time. Generally, total BTEX and TPH levels found in gasoline-contaminated tank draws are in the range of 50 to 100 ppm and 25 to 400 ppm, respectively. With the higher BTEX and TPH concentrations, one would expect the corresponding removal efficiency of the air stripper to increase. Also, because most of the additional volatile organic contaminant would be stripped out in the air stripper, it would be expected that the final GAC effluent results would be similar to those shown here.

The air stripper removal efficiency for TPH was at 77.6%, whereas for BTEX (volatile constituents), the removal efficiency was much higher (greater than 95%). It is believed likely that most of the volatile constituents in the wastewater were stripped, while the remaining semivolatile constituents (such as ammonia and phenolic compounds) were not removed by the air stripper.

EXAMPLE 2

Air Stripper Design

The design procedures that were used to design the air stripper were based on a general equation which relates packing height to mass transfer coefficient, removal efficiency, Henry's constant, and air-to-water ratio. The height of packing Z required to achieve the desired removal of solute is the product of two quantities—the height of transfer unit (HTU), and the number of transfer unit (NTU).

$$Z = (HTU)(NTU) \quad (1)$$

$$NTU = \frac{R}{R-1} \ln \frac{x_1/x_2 (R-1) + 1}{R} \quad (2)$$

where R is the stripping factor defined as $R = H_A G/L$; $x_1$ is the influent mole fraction; $x_2$ is the effluent mole fraction; $H_A$ is the Henry's Law Constant; G is the superficial molar air flowrate (kmole sec.m$^2$); and L is the superficial molar water flowrate (kmole sec.m$^2$).

NTU is closely associated with HTU and the packing height. It characterizes the degree of difficulty of removing solute from the liquid phase. As can be shown from equation (2), the NTU depends on the desired removal efficiency, the air-to-water ratio, and the Henry's Law constant.

HTU is inversely proportional to the product of the overall liquid phase mass transfer coefficient and the interfacial area. It characterizes the efficiency of mass transfer from water to air. To compute HTU, data on mass transfer coefficients are required. These values may be determined from pilot studies on the contaminated water. However, in the absence of these data, Applicants used the HTU supplied by the packing manufacturer (Koch Engineering).

In such design a standard tower diameter of two feet was selected. This size is believed typical for liquid flowrates of 10 to 20 GPM.

The following design procedure was used:

1. Selection of an efficient packing material that is expected to give good mass transfer at low gas head loss. Based on information from Koch Engineering, Inc. (the packing manufacturer), Applicants selected 1" plastic Flexirings ® and a recommended gas pressure drop of 0.12 in. H$_2$O/feet of packing depth. It is believed most stripping towers are designed to operate with a gas pressure drop well below flooding conditions, usually in the range of 0.25-0.5 in. H$_2$O/feet of packing depth. For removal of volatile compounds with Henry's Law constants greater than 100 atm (benzene's is 240 atm), a lower design gas pressure drop may be more cost-effective.

2. Determine the allowable superficial velocity. Referring to Koch's Pressure Drop—Capacity Curves for the 1" plastic Flexirings ®, a superficial velocity of 2.78 ft/s (volumetric air flow rate of 524 cubic feet per minute based on standard conditions, 20° C. and 1 atm) was obtained based on the liquid flowrate of 12 GPM and the selected gas pressure drop of 0.12 in. H$_2$O/ft of packing depth. Determine the NTU.

3. The NTU was calculated to be 4.66 using equation (2), and based on 99% removal efficiency for benzene and a stripping factor of 63.

4. Determine the HTU. A HTU of 2.3 ft was obtained from Koch Engineering, Inc. for the 1" plastic Flexirings ®.

5. Height of packing. The height of packing required to achieve the desired removal efficiency of benzene at 99% is 15 ft assuming a safety factor 1.4.

EXAMPLE 3

Calculation of Expected Activated Carbon Filter Life

The basis for the carbon capacity calculations is the Freundlich Isotherm relationship which is described by the following equation:

$$X/M = KC^{1/n}$$

Where:
X/M = The equilibrium capacity (mg adsorbed g of carbon
K,n = Empirical constants, characteristic of solute/carbon system
C = Equilibrium concentration (mg/L)

The isotherm coefficients describe the equilibrium capacity of carbon for a particular solute. A log-log plot of X/M vs. C from experimental data gives a straight line of slope 1/n and intercept K at C=1.0.

Within an operating carbon tank there is an area where the carbon is exhausted (i.e. saturated with a solute at the influent concentration). Downstream from this section is the mass transfer zone (MTZ), in which adsorption is taking place. Within the MTZ, a concentration profile develops. It is typically described by an S-shaped curve, with high concentration toward the influent end of the MTZ, decreasing to near zero concentration toward the effluent end of the MTZ. As more carbon is exhausted, the MTZ moves through the tank until the front edge reaches the end of the bed, breakthrough occurs, and the effluent concentration of hydrocarbon compounds begins to increase. When the effluent concentration equals that of the untreated water, complete exhaustion of the ability of the absorbent to retain the compound(s) of interest has occurred.

The empirical constants for the Freundlich Isotherm relationship are given in Table 1. The calculations for the GAC filter life based on BTEX concentrations in the average expected influent wastewater stream are shown in Table 2.

TABLE 1

| Constants for the Freundlich Isotherm Relationship | | |
| --- | --- | --- |
| Chemical | K | 1/n |
| Benzene | 4.1 | 0.545 |
| Toluene | 26.1 | 0.440 |
| Ethylbenzene | 53.0 | 0.790 |
| Xylene | 85.0 | 0.190 |

TABLE 2

| GAC Filter Life Calculations | | | | |
| --- | --- | --- | --- | --- |
| Chemical | Concentration (mg/L) | X/M (mg/g) | Carbon Req. (g/L) | Carbon Req. (lbs/gal) |
| Benzene | 41.6 | 31.3 | 1.33 | 0.011 |
| Toluene | 39.7 | 131.9 | 0.30 | $2.50 \times 10^{-3}$ |
| Ethylbenzene | 3.74 | 150.3 | 0.03 | $2.50 \times 10^{-4}$ |
| Xylene | 21.9 | 152.9 | 0.14 | $1.17 \times 10^{-3}$ |
| | | | | 0.015 |

330 lbs/filter/0.015 lbs/gal = 22,000 gal/filter

EXAMPLE 4

Selection of Clay Filter Medium

A technical problem in the application of activated carbon water treatment systems is the presence of oil and grease extractable organics. These organics tend to be higher molecular weight, less water-soluble compounds usually occurring as emulsions. Such organic contaminants tend to foul activated carbon by blocking the pore structure of the carbon, which lowers the surface area available for adsorption, and results in loss of capacity in the carbon unit. A solution to this problem embodied in the present invention, is to remove the oil and grease with a clay filter prior to activated carbon treatment.

Clay filtration differs from activated carbon in the mechanism of sorption. Activated carbon adsorbs organics through a surface-area related mechanism. Clay operates through a partitioning phenomena that has little relationship to surface area. The effectiveness of the clay to absorb organics is directly related to the water solubility of the organic. There is a linear relationship between the partition coefficient and water solubility of the organic. In practical terms this means that any organic that would be extracted in a traditional oil and grease determination will be absorbed strongly by clay, but organics that are highly water soluble or that are volatile will absorb poorly.

The clay product utilized in the treatment system of the present invention is Technical Minerals' TM-100. This product is manufactured by Technical Minerals of Jackson, Miss. 39205 and packaged in a modular container by TIGG Corporation of Pittsburgh, Pa. TM-100 is composed of 30% active absorber (clay material) and 70% anthracite filter media (anthracite is a form of coal). The TM-100 product will absorb up to 60% of its weight in oil and grease, in contrast to carbon, which will absorb only 2 to 3% of its own weight. In addition, TM-100 will absorb lightly emulsified oil and grease from solution. When TM-100 is utilized as a pretreatment to carbon, it removes the oil and grease extractables and allows carbon to remove the water soluble organics more efficiently, and with higher capacity. The lifetime of carbon can be extended when combined with TM-100 and costs can be reduced over carbon alone depending upon the oil and grease levels in the wastewater.

Clay Filter Life

Calculation of the clay filter life is based on the following assumptions:
TM-100 will absorb 60% of its weight in oil and grease
100 ppm oil and grease in the wastewater (i.e. $8.34 \times 10^{-4}$ lbs of oil and grease per gal of wastewater); and
100% removal efficiency of oil and grease.
$(0.6 \times 605 \text{ lbs})/8.34 \times 10^{-4} \text{ lbs/gal} = 435,250 \text{ gal}$ It will be understood, however, that even though these numerous characteristics and advantages of the invention have been set forth in the foregoing description, together with details of the structure and function of the invention, the disclosure is illustrative only, and changes may be made in detail, especially in matters of shape, size and arrangement of parts or in the sequence or the timing of the steps, within the broad principle of the present invention to the full extent indicated by the broad general meaning of the terms in which the appended claims are expressed.

What is claimed is:

1. A process for treating waste water having at least an insoluble organic contaminant, a volatile hydrocarbon contaminant, and a dissolved hydrocarbon contaminant, said process including the steps of:
   (a) forming a multiphase liquid system including an aqueous hydrocarbon-contaminated layer and isolating said aqueous hydrocarbon-contaminated layer from said multi-phase liquid system;
   (b) reducing the concentration of volatile hydrocarbon contaminant by stripping and removing insoluble organic contaminant in said aqueous hydrocarbon contaminated layer by absorption to form a dissolved hydrocarbon-contaminated wastewater;
   (c) reducing the concentration of dissolved hydrocarbon contaminant in said dissolved hydrocarbon contaminated wastewater by absorption; and
   (d) discharging treated water; said process not comprising a biological treatment step.

2. The process of claim 1, wherein the step of forming a multi-phase liquid system comprises a gravity-induced phase separation process.

3. The process of claim 1, wherein said step of reducing the concentration of volatile hydrocarbon contaminant and insoluble organic contaminant includes a first step of reducing the concentration of volatile hydrocarbon contaminant by stripping to form a volatile hydrocarbon-depleted wastewater and a second step of reducing the concentration of insoluble organic contaminant in said volatile hydrocarbon-depleted wastewater by adsorption to form said dissolved hydrocarbon-contaminated wastewater.

4. The process of claim 3, wherein the first step of reducing the concentration of volatile hydrocarbon contaminant comprises aerating said aqueous hydrocarbon-contaminated layer.

5. The process of claim 4, wherein the step of aerating comprises feeding said aqueous hydrocarbon-contaminated layer through a counter-current air stripper process.

6. The process of claim 3, wherein the first step of reducing the concentration of volatile hydrocarbon contaminant includes reducing the amount of said volatile hydrocarbon contaminant by at least about 90% of the concentration of said volatile hydrocarbon contaminant in the aqueous hydrocarbon-contaminated layer.

7. The process of claim 1, wherein the step of reducing the concentration of insoluble organic contaminant comprises treating the aqueous hydrocarbon-contaminated layer with activated clay.

8. The process of claim 7, which includes treating the volatile hydrocarbon-depleted wastewater with a filter medium comprising a mixture of clay material and anthracite coal.

9. The process of claim 3, wherein the second step of reducing the concentration of insoluble organic contaminant comprises treating the volatile hydrocarbon-depleted wastewater with activated clay.

10. The process of claim 3, wherein the second step of reducing the concentration of insoluble organic contaminant includes reducing the amount of said insoluble organic contaminant by at least about 90% of the concentration of said insoluble organic contaminant in the aqueous hydrocarbon-contaminated layer.

11. The process of claim 1, wherein the step of reducing the concentration of dissolved hydrocarbon contaminant comprises treating the dissolved hydrocarbon-contaminated wastewater with activated carbon.

12. The process of claim 11, wherein the step of reducing the concentration of dissolved hydrocarbon contaminant includes reducing the concentration of dissolved hydrocarbon contaminant by at least about 90% of the concentration of said dissolved hydrocarbon contaminant in the aqueous hydrocarbon-contaminated layer.

13. The process of claim 11, wherein the step of treating the dissolved hydrocarbon-contaminated wastewater with activated carbon includes passing said dissolved hydrocarbon-contaminated wastewater through at least two activated carbon filters in series.

14. The process of claim 1, wherein the wastewater to be treated is obtained from petroleum bulk storage tanks and ground water from spill sites at petroleum bulk storage tanks.

15. The process of claim 1, including a step of adding an antifoam chemical prior to the step of reducing the concentration of volatile hydrocarbon contaminant.

16. An arrangement for treating hydrocarbon-contaminated wastewater which comprises:
(a) a separator constructed and arranged to retain hydrocarbon-contaminated wastewater while a portion of immiscible hydrocarbon separates from the hydrocarbon-contaminated wastewater to form two phases, said separator including means for separating a resulting immiscible hydrocarbon layer from a resulting separated water layer;
(b) an air stripper constructed and arranged to reduce the amount of volatile hydrocarbons in water contaminated therewith as the water passes through the air stripper;
(c) means for transferring the water layer from the separator through the air stripper;
(d) an activated clay filter, constructed and arranged to reduce the amount of insoluble organic contaminants in water contaminated therewith as the water passes through the activated clay filter;
(e) means for transferring the volatile hydrocarbon-depleted water through the activated clay filter;
(f) an activated carbon filter arrangement, constructed and arranged to reduce the amount of dissolved hydrocarbon contaminants in water contaminated therewith as the water passed through the activated carbon filter arrangement; and
(g) means for transferring the insoluble hydrocarbon-depleted water through the activated carbon filter arrangement;
(h) said arrangement not comprising means for conducting biological treatment.

17. The arrangement of claim 16, wherein the countercurrent air stripper comprises:
(a) a vertical standing vessel containing packing material;
(b) means for distributing a liquid to be treated over the inside diameter of the air stripper, proximate the top thereof and directing the liquid to be treated downwardly through the vessel; and,
(c) means for forcing air in an upward direction through the inside of the air stripper and countercurrent to a flow of liquid to be treated.

18. The arrangement of claim 16, wherein the activated clay filter comprises a mixture of clay and anthracite filter mediums.

19. The arrangement of claim 16, wherein the activated carbon filter comprises at least two filters in series constructed and arranged to allow selected backwashing.

20. An arrangement for treating hydrocarbon contaminated wastewater which comprises:
(a) a separator constructed and arranged to retain hydrocarbon-contaminated wastewater while a portion of the immiscible hydrocarbon separates from the hydrocarbon-contaminated wastewater to form two phases, wherein the separator comprises an enclosed vessel incorporating a port for viewing an interface between the two phases and an adjustable vertical sliding flex tube constructed and arranged to selectively decant the immiscible hydrocarbon layer;
(b) an air stripper constructed and arranged to reduce the amount of volatile hydrocarbons in water contaminated therewith as the water passes through the air stripper;
(c) means for transferring the water layer from the separator through the air stripper;
(d) an activated clay filter, constructed and arranged to reduce the amount of insoluble organic contaminants in water contaminated therewith as the water passes through the activated clay filter;
(e) means for transferring the volatile hydrocarbon-depleted water through the activated clay filter;
(f) an activated carbon filter arrangement, constructed and arranged to reduce the amount of dissolved hydrocarbon contaminants in water contaminated therewith as the water passes through the activated carbon filter arrangement; and
(g) means for transferring the insoluble hydrocarbon-depleted water through the activated carbon filter arrangement.

* * * * *

UNITED STATES PATENT AND TRADEMARK OFFICE
CERTIFICATE OF CORRECTION

PATENT NO. : 5,266,208
DATED : November 30, 1993
INVENTOR(S) : Shawn M. Stahly, See C. Chen, Clay A. Ellison It is certified that error appears in the above-indentified patent and that said Letters Patent is hereby corrected as shown below:

Column 3, line 65, delete "absorbed" and insert therefor --adsorbed--.

Column 12, line 29, delete "Determine the NTU".

Column 12, line 30, after the numeral "3", insert --Determine the NTU.--.

Column 12, line 50, after the word "adsorbed", insert therefor --/--.

Claim 5, column 15, line 5, delete "counter-current" and insert therefore --countercurrent--.

Claim 16(f), column 16, line 12, delete "passed", and insert therefor --passes--.

Signed and Sealed this

Twenty-seventh Day of May, 1997

BRUCE LEHMAN

Attest:

Attesting Officer

Commissioner of Patents and Trademarks